US012284933B2

(12) United States Patent
Corpstein

(10) Patent No.: US 12,284,933 B2
(45) Date of Patent: Apr. 29, 2025

(54) METHODS OF OPERATING A TILLAGE IMPLEMENT

(71) Applicant: AGCO Corporation, Duluth, GA (US)

(72) Inventor: Keith Robert Corpstein, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 856 days.

(21) Appl. No.: 17/594,347

(22) PCT Filed: Mar. 17, 2020

(86) PCT No.: PCT/IB2020/052418
§ 371 (c)(1),
(2) Date: Oct. 12, 2021

(87) PCT Pub. No.: WO2020/217106
PCT Pub. Date: Oct. 29, 2020

(65) Prior Publication Data
US 2022/0183214 A1  Jun. 16, 2022

Related U.S. Application Data

(60) Provisional application No. 62/839,259, filed on Apr. 26, 2019.

(51) Int. Cl.
A01B 79/00 (2006.01)
A01B 59/042 (2006.01)
(Continued)

(52) U.S. Cl.
CPC .............. A01B 79/005 (2013.01); G01J 5/00 (2013.01); G06T 7/90 (2017.01); G06T 7/97 (2017.01);
(Continued)

(58) Field of Classification Search
CPC ... A01B 79/005; A01B 59/042; A01B 63/002; G06T 7/97; G06T 7/90;
(Continued)

(56) References Cited

U.S. PATENT DOCUMENTS 6,553,299 B1  4/2003  Keller et al.
6,574,363 B1  6/2003  Classen et al.
(Continued)

FOREIGN PATENT DOCUMENTS

EP  2 936 957 A1  10/2015
EP  3 167 698 A1   5/2017
(Continued)

OTHER PUBLICATIONS

UK Intellectual Property Office, Search Report for related UK Application No. GB GB 1906681.0, dated Nov. 5, 2019.
(Continued)

Primary Examiner — Huan Le

(57) ABSTRACT

A method of operating a tillage implement includes performing a first calibration of the tillage implement based on a curated library, propelling the tillage implement through a field, capturing an image of the field with a camera carried by the tillage implement, comparing information from the captured image with the curated library, identifying residue based on the comparison of the information from the captured image with the curated library, modifying the curated library based on the captured image, and performing a second calibration of the tillage implement based on the modified library. The curated library includes a correlation of observed data with material properties of soil and/or residue, and may initially be based on information from other fields or prior times. The tillage implement has at least
(Continued)

one ground-engaging tilling assembly, and propelling the tillage implement through the field causes the tilling assembly to work the soil.

17 Claims, 4 Drawing Sheets

(51) Int. Cl.
    *A01B 63/00*     (2006.01)
    *G01J 5/00*     (2022.01)
    *G06T 7/00*     (2017.01)
    *G06T 7/90*     (2017.01)

(52) U.S. Cl.
    CPC ........... *A01B 59/042* (2013.01); *A01B 63/002* (2013.01); *G01J 2005/0077* (2013.01); *G06T 2207/10048* (2013.01); *G06T 2207/30188* (2013.01); *G06T 2207/30252* (2013.01)

(58) Field of Classification Search
    CPC . G06T 2207/10048; G06T 2207/30188; G06T 2207/30252; G01J 5/00; G01J 2005/0077
    See application file for complete search history.

(56) References Cited

U.S. PATENT DOCUMENTS

| | | | |
|---|---|---|---|
| 7,028,554 | B2 | 4/2006 | Adamchuk et al. |
| 9,144,188 | B2 | 9/2015 | Bover Trobat |
| 9,282,688 | B2 | 3/2016 | Casper et al. |
| 2013/0192855 | A1 | 8/2013 | Meek |
| 2014/0054051 | A1 | 2/2014 | Landoll et al. |
| 2015/0324648 | A1 | 11/2015 | Wilson et al. |
| 2016/0134844 | A1* | 5/2016 | Casper ................... H04N 23/20 348/135 |
| 2016/0183445 | A1 | 6/2016 | Meier et al. |
| 2017/0112043 | A1 | 4/2017 | Nair et al. |
| 2017/0112056 | A1 | 4/2017 | Sierra et al. |
| 2017/0112057 | A1 | 4/2017 | Loukili et al. |
| 2018/0108123 | A1 | 4/2018 | Baurer et al. |
| 2018/0184581 | A1 | 7/2018 | Morgan et al. |
| 2018/0206393 | A1 | 7/2018 | Stoller et al. |
| 2018/0210450 | A1 | 7/2018 | Ferrari et al. |
| 2018/0259496 | A1 | 9/2018 | McPeek |
| 2018/0279599 | A1 | 10/2018 | Struve |
| 2018/0330166 | A1 | 11/2018 | Redden et al. |
| 2019/0050948 | A1 | 2/2019 | Perry et al. |
| 2019/0236359 | A1 | 8/2019 | Posselius |
| 2019/0377986 | A1 | 12/2019 | Ferrari et al. |
| 2020/0387720 | A1 | 12/2020 | Stanhope |
| 2022/0183206 | A1 | 6/2022 | Nair et al. |

FOREIGN PATENT DOCUMENTS

| | | |
|---|---|---|
| EP | 3189719 A1 | 7/2017 |
| EP | 3406124 A1 | 11/2018 |
| RU | 2537908 C2 | 1/2015 |
| SU | 1646495 A1 | 5/1991 |

OTHER PUBLICATIONS

European Patent Office, International Search Report for related International Application No. PCT/IB2020/052418, mail date Jun. 15, 2020.

Federal Institute of Industrial Property, Official Action related to Russian Patent Application No. RU2021134541/10 (073003), dated Jun. 30, 2023, 18 pages including translation.

Federal Institute of Industrial Property, Search Report related to Russian Patent Application No. RU2021134541/10 (073003), dated Jun. 30, 2023, 4 pages including translation.

* cited by examiner

METHODS OF OPERATING A TILLAGE IMPLEMENT

CROSS-REFERENCE TO RELATED APPLICATION

This application is a national phase entry under 35 U.S.C. § 371 of International Patent Application PCT/IB2020/052418, filed Mar. 17, 2020, designating the United States of America and published in English as International Patent Publication WO 2020/217106 A1 on Oct. 29, 2020, which application claims the benefit of the filing date of U.S. Provisional Patent Application 62/839,259, "Methods of Operating a Tillage Implement," filed Apr. 26, 2019, the entire disclosure of each of which is incorporated herein by reference.

FIELD

Embodiments of the present disclosure relate to measurement of conditions in an agricultural field. More particularly, embodiments of the present disclosure relate to apparatus and methods for identifying residue in a field.

BACKGROUND

Crop yields are affected by a variety of factors, such as seed placement, soil quality, weather, irrigation, and nutrient applications. Soil quality is affected by the amount of residue left on the surface of the soil at the end of a growing season. As used herein, the term "residue" means plant material that is not mixed into soil. Residue may be used to control erosion, moisture flow into and out of the soil, temperature of the soil, and other properties.

In some fields and with some crops, it is desirable to keep the amount of residue in a given area relatively constant. In other circumstances, it may be desirable to vary the amount of residue in a given area (e.g., based on topography, soil type, water table, etc.). However, measurement of residue is difficult using conventional methods.

Therefore, it would be beneficial for a farmer to know the amount of residue at each point in the field so that the field can be worked appropriately.

BRIEF SUMMARY

In some embodiments, a method of operating a tillage implement includes performing a first calibration of the tillage implement based on a curated library, propelling the tillage implement through a field, capturing an image of the field with a camera carried by the tillage implement, comparing information from the captured image with the curated library, identifying residue in the image based on the comparison of the information from the captured image with the curated library, modifying the curated library based on the captured image, and performing a second calibration of the tillage implement based on the modified library. The curated library includes a correlation of previously observed data with material properties of soil and/or residue, and may initially be based on information from other fields or the field at prior times. The tillage implement has at least one ground-engaging tilling assembly, and propelling the tillage implement through the field causes the at least one tilling assembly to work soil being traversed by the tillage implement.

In other embodiments, a method of operating a tillage implement includes capturing an image of a field with a camera carried by the tillage implement while at least one tilling assembly works the soil, comparing the captured image with a curated library, identifying residue in the image based on the comparison of the image with the curated library, adjusting an operating parameter of the tillage implement based at least in part on the identified residue, and modifying the curated library based on the captured image.

A non-transitory computer-readable storage medium includes instructions that when executed by a computer, cause the computer to perform methods disclosed herein.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
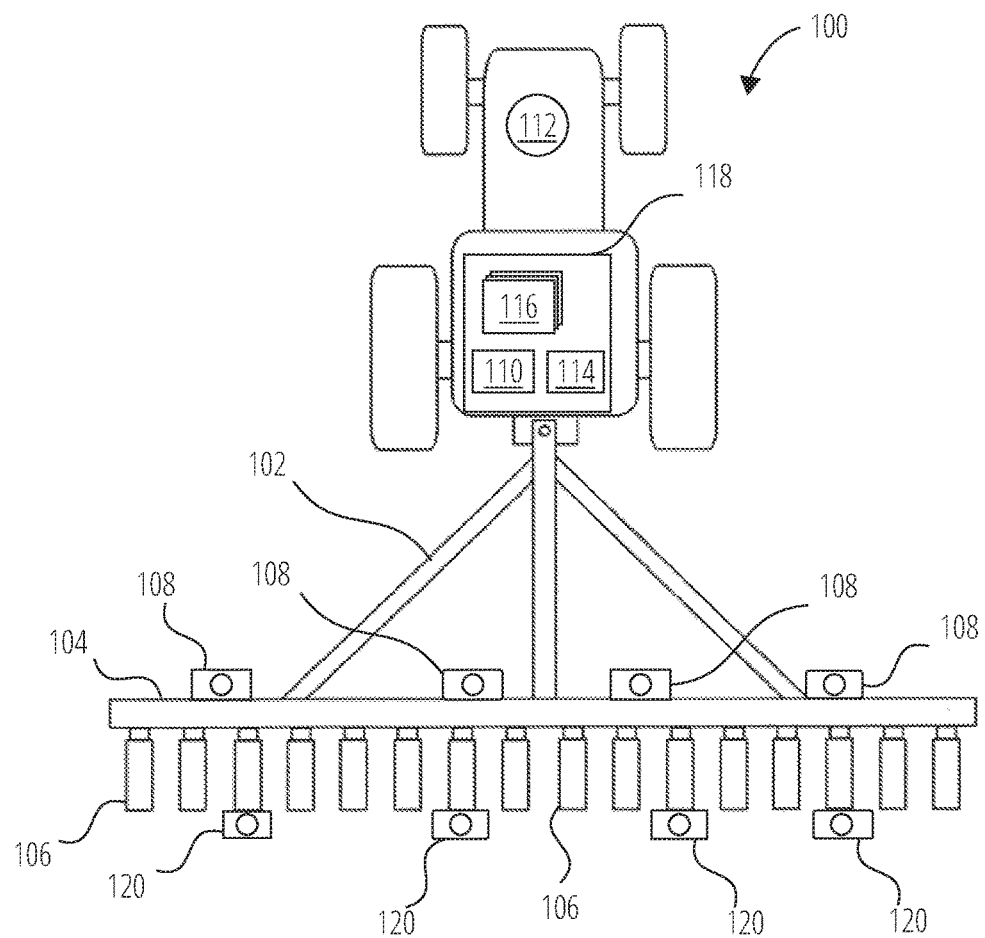
FIG. 1 illustrates a tractor and a tillage implement in accordance with one embodiment of the present disclosure.

The illustrations presented herein are not actual views of any tillage implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates a tractor 100 drawing tillage implement 102, which includes a draw bar 104 supporting multiple ground-engaging tilling assemblies 106 and one or more cameras 108. A computer 118, which may include a central processing unit ("CPU"), memory, and a graphical user interface ("GUI") (e.g., a touch-screen interface), is located in the cab of the tractor 100. A global positioning system ("GPS") receiver 112 may be mounted to the tractor 100 and connected to communicate with the computer 118. The computer 118 may include an implement controller 110 configured to communicate with the tilling assemblies 106 and/or the GPS receiver 112, such as by wired or wireless communication.

The cameras 108 may be oriented to take images of a surface of a field in which the tractor 100 operates. The cameras 108 may be configured to measure visible, ultraviolet (UV), and/or infrared (IR) radiation. Each of the cameras 108 may be oriented such that the field-of-view includes the ground in front of the tilling assemblies 106 (in the direction of travel of the tractor 100) so that the cameras 108 take images of all or a portion of the path over which the tillage implement 102 travels. In some embodiments, the cameras 108 may be oriented such that the images collected thereby may be combined to form a single image of the ground. That is, the images may have a small overlap or no overlap. The computer 118 may receive a signal from the GPS receiver 112 to assist the computer 118 in locating the tractor 100 and the images collected by the cameras 108 in the field. Methods of combining images collected from multiple perspectives into a single image are known in the art and not described in detail herein.

The implement controller 110 may control the tillage implement 102 such that the tilling assemblies 106 each work the soil in the field at a selected depth. The tilling assemblies 106 may include any of a variety of tools, such as those described in U.S. Patent Application Publication 2016/0183445, "Rotary Spider Tine for Tillage Implement," published Jun. 30, 2016; U.S. Patent Application Publication 2013/0192855, "Interlocking Basket for Strip Tillage Machine," published Aug. 1, 2013; and U.S. Patent Application Publication 2014/0054051, "Implement with Raisable Soil-Leveling Cylinders," published Feb. 27, 2014; the entire disclosures of each of which are hereby incorporated by this reference.

In some embodiments, the depth of the tilling assemblies 106 may be set by the implement controller 110, though the tilling assemblies 106 may not be individually adjusted by the implement controller 110—contours of the ground may prevent the tilling assemblies 106 from all operating at the same depth. In other embodiments, the tilling assemblies 106 may be individually adjusted. The tilling assemblies 106, the tillage implement 102, and the tractor 100 may have other parameters that may also be adjusted, such as a gang angle, a gang depth, an implement depth, a shank depth, a time delay, a data-filtering parameter, a finishing tool pressure, a finishing tool angle, a hitch draft load, a wheel load, a vehicle speed, etc. The tilling assemblies 106 may operate to cut, chop, grind, scrape, or otherwise manipulate the soil and residue as the tractor 100 and the tillage implement 102 traverse the field. In some embodiments, the tillage implement 102 may be configured to collect a portion of the residue. In other embodiments, the tilling assemblies 106 may mix a portion of the residue with the soil, such that the residue is under the surface of the ground. The depth of the tilling assemblies 106 may affect the amount of the residue that remain on top of the soil (as opposed to mixed into the soil or collected by the tillage implement 102).

The implement controller 110 may use a calibration 114 (e.g., stored in a memory of the computer 118) to correlate information from the cameras 108 with an operating parameter of the tilling assemblies 106 that is expected to produce a selected outcome (e.g., an amount of residue remaining on the surface after the tillage implement 102 passes over the ground). The computer 118 may receive images from the cameras 108 and interpret the images based on the calibration 114. The implement controller 110 may set the operating parameter of the tilling assemblies 106 based on the interpretation. For example, if the images indicate a relatively high amount of MOG (material other than grain, i.e., a material separated from grain and left by a combine harvester on a field after harvesting the grain) on the surface of the ground, the tilling assemblies 106 may be adjusted such that a higher amount of the MOG is tilled into the soil. If the images indicate a sandy soil, the tilling assemblies 106 may be adjusted such that a lower amount of the MOG is tilled into the soil. Thus, the remaining residue over the soil may preserve the moisture content of the soil. The computer 118 may also interpret the images to determine properties such as topography and current moisture level.

The calibration 114 may be based at least in part on information in a library 116, which may initially be a curated library. As used herein, the term "curated library" means and includes a collection of information existing before a tillage operation begins. The library 116 may include data collected from the current field at an earlier time, as well as data collected from other fields selected based on a similarity with the current field (e.g., moisture levels, soil type, crop type, etc.). The library 116 may include maps, photographs, spectral analyses, etc. For example, the library 116 may include a topographical map, a soil map, a planting map, photographs of the field, photographs of other fields, color information about selected plants, photographs of selected plants under various conditions, etc. In some embodiments, the library 116 may include information about soil erosion properties (e.g., a map identifying locations of highly erodible soils).

The tillage implement 102 may also carry additional cameras 120 following the tilling assemblies 106, which may also capture images of the ground surface after the tilling assemblies 106 pass. The captured images may be transmitted to the computer 118, which may use the captured images to determine whether the operating parameters are adequate to achieve the selected amount of residue on the ground after the tillage implement 102 works the ground.

Figure 2:
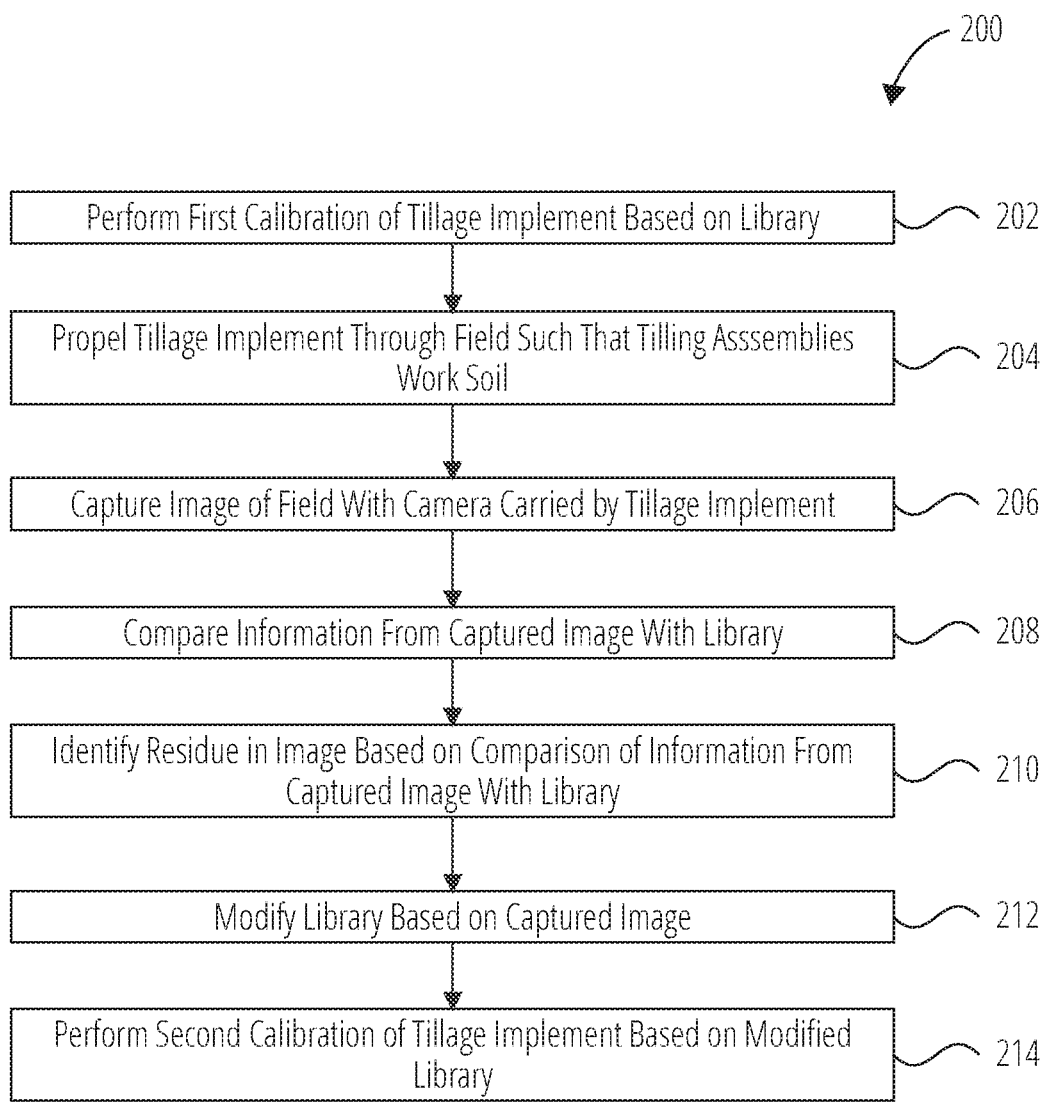
FIG. 2 is a simplified flow chart illustrating an example method of operating the tractor and tillage implement shown in FIG. 1.

FIG. 2 is a simplified flow chart illustrating a method 200 in which the tractor 100 and the tillage implement 102 (FIG. 1) may be used to work a field. In block 202, a first calibration of the tillage implement 102 is performed based on the library 116 (initially a curated library). That is, the computer 118 on the tractor 100 or another computer prepares the calibration 114 using known data. The curated library 116 may include data from the same or similar fields. For example, the curated library 116 may include data from the current field observed on a prior occasion (e.g., a prior planting season, earlier in the season, etc.). The curated library 116 generally includes a correlation of previously observed data with material properties of soil and/or residue, such as moisture levels, light conditions, soil types, ground cover amounts and types, and crop types. For example, the curated library 116 may contain shapes of leaves, stalks, seeds, flowers, rocks, etc. The curated library 116 may also contain information about the color or other radiative signature of such objects, both visible and invisible (e.g., infrared, ultraviolet).

The first calibration may be performed, for example, by the computer 118 (FIG. 1). The calibration 114 may at first be relatively poorly adapted to setting the tillage implement 102 to work the current field, because the data in the library 116 may not match the conditions of the current field well. For example, differences in lighting, humidity, crop cover, and other parameters in the library 116 may differ from the current conditions. Nonetheless, the initial calibration 114 based on the curated library 116 may provide a useful starting point to begin working the field.

In block 204, the tractor 100 (FIG. 1) propels the tillage implement 102 through the field such that the tilling assemblies 106 work the soil. The implement controller 110 may adjust an operating parameter of the tilling assemblies 106, the tillage implement 102, or the tractor 100, such that a selected amount of residue will be left on the ground after the tillage implement 102 works the ground (to the extent the current field conditions match the calibration 114). For example, the implement controller 110 may adjust at least one parameter selected from the group consisting of a gang angle, a gang depth, an implement depth, a shank depth, a time delay, a data-filtering parameter, a finishing tool pressure, a finishing tool angle, a hitch draft load, a wheel load, and a vehicle speed.

In block 206, the cameras 108 (FIG. 1) carried by the tillage implement 102 capture one or more images of the field. The images are transferred to the computer 118. In some embodiments, the computer 118 may process the images, such as by stitching images together, correlating the images with maps, etc. The images may be captured before or after the tilling assemblies 106 work the field. In some embodiments, images of the field may be captured before and after the tilling assemblies 106 work the field.

In block 208, the computer 118 (FIG. 1) compares information from the captured images with the library 116. For example, the computer 118 may compare information such as shapes, an electromagnetic spectrum (e.g., colors, infrared radiation, ultraviolet radiation), reflectivity, etc., or combinations thereof. For example, the computer 118 may compare colors and shapes in captured images with the library 116. The computer 118 may include programming to identify such information in the captured images.

In block 210, the computer 118 identifies residue in the image (i.e., identifies residue on the ground surface as shown in the captured image) based on the comparison of the image with the library 116. For example, the computer 118 may identify the amount of residue on the surface of the field. The computer 118 may identify MOG. The computer 118 may also identify soil in the image, a property of the soil, or a topography of the ground.

In block 212, the computer 118 modifies the library 116 based on the captured image. The captured image or information derived therefrom may add to or replace other information in the library 116. By modifying the library 116, the computer 118 may improve the library 116 based on more recent data. That is, the library 116 may become more effective for the current conditions. For example, such modification may improve the ability of the computer 118 to recognize items in the field based on current lighting and moisture levels.

In block 214, a second calibration of the tillage implement is performed based on the modified library. The second calibration may be performed by the computer 118 while the tractor 100 travels through the field. Thus, the second calibration may be used for subsequent work in the field, without the need to return to a base for updating. The method 200 may be repeated during field work, such that the settings of the tractor 100, the tillage implement 102, and the tilling assemblies 106 can be modified based on then-current conditions throughout the time period of the work. The elements shown may be performed in any order or simultaneously. For example, updating the library and performing the second calibration (or third, fourth, fifth, etc.) may be performed every time a set of images are captured by the cameras 108.

If images of the field are captured before and after the tilling assemblies 106 work the field, the computer 118 may compare both sets of images with the library 116. For example, if the tilling assemblies 106 are adjusted to achieve a certain amount of residue remaining, the computer 118 may compare the image of the field immediately after working to verify the actual amount of residue remaining.

Figure 3:
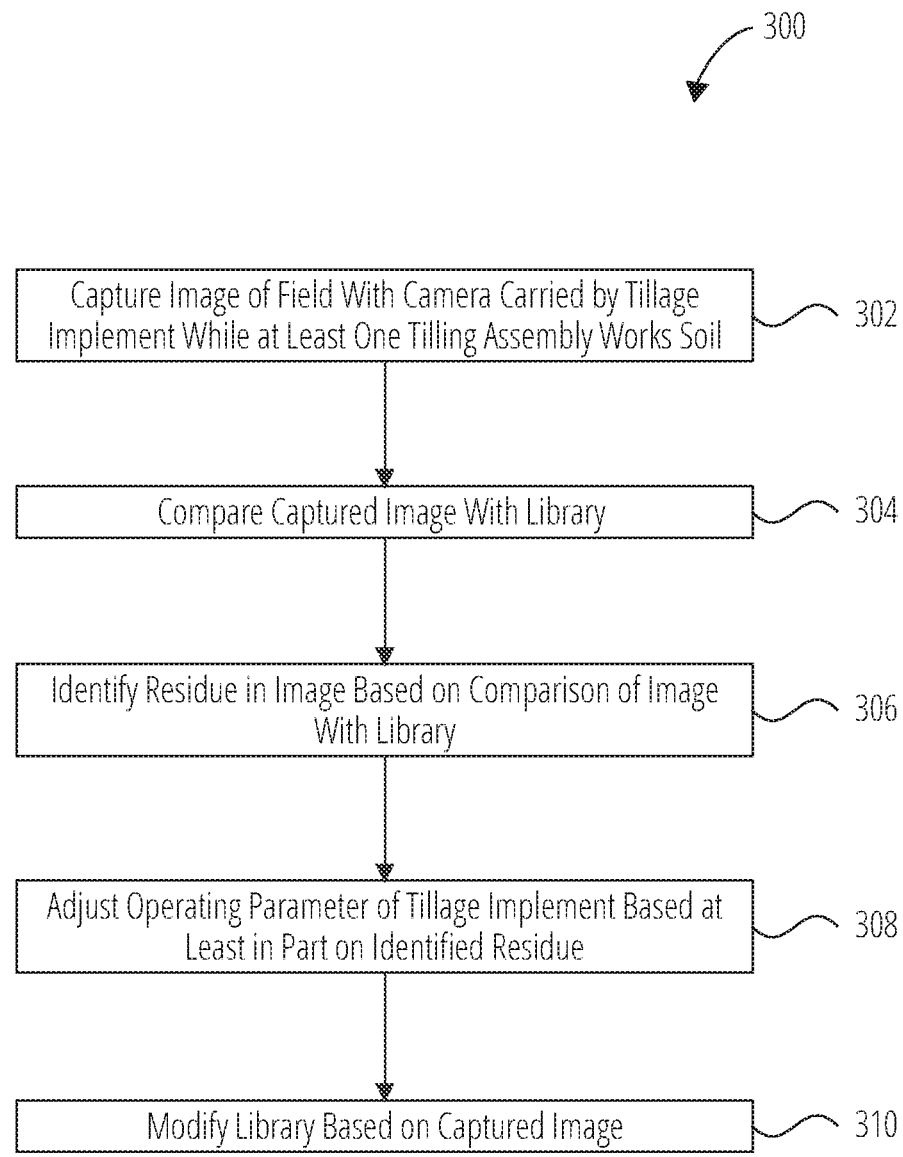
FIG. 3 is a simplified flow chart illustrating another example method of operating the tractor and tillage implement shown in FIG. 1.

FIG. 3 is a simplified flow chart illustrating another method 300 in which the tractor 100 and the tillage implement 102 (FIG. 1) may be used to work a field. In block 302, cameras 108 carried by the tillage implement 102 capture one or more images of a field while tilling assemblies 106 work the soil traversed by the tillage implement 102. In block 304, the computer 118 compares the captured image (s) with a curated library 116, which includes a correlation of observed data with material properties of soil and/or residue. In block 306, the computer 118 identifies residue in the image based on the comparison of the image with the curated library 116. In block 308, the implement controller 110 adjusts an operating parameter of the tillage implement 102 based at least in part on the identified residue. In block 310, computer 118 modifies the library 116 based on the captured image. The method may be repeated as necessary, and the elements shown may be performed in any order or simultaneously.

Figure 4:
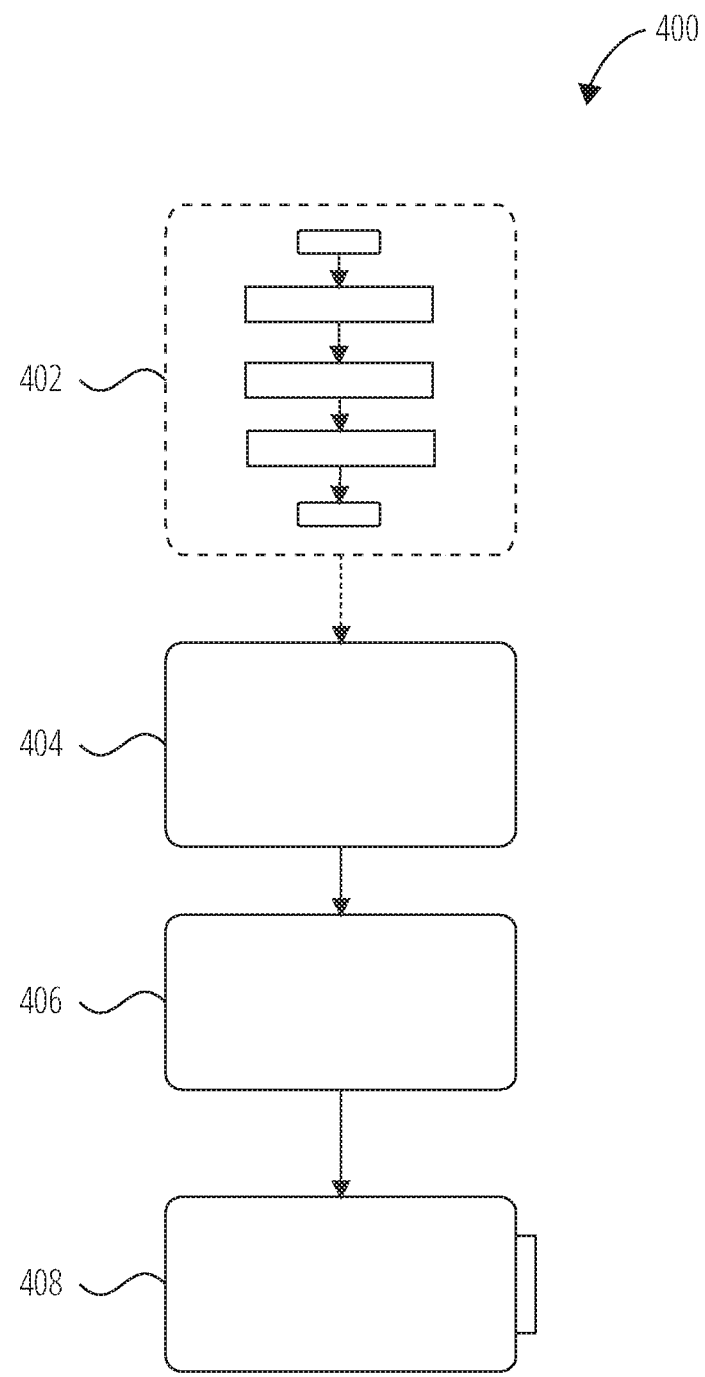
FIG. 4 illustrates an example computer-readable storage medium comprising processor-executable instructions configured to embody one or more of the methods of operating the tractor and tillage implement shown in FIG. 1, such as the methods illustrated in FIGS. 2 and 3.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 4, wherein an implementation 400 includes a computer-readable storage medium 402 (e.g., a flash drive, CD-R, DVD-R, application-specific integrated circuit (ASIC), field-programmable gate array (FPGA), a platter of a hard disk drive, etc.), on which is computer-readable data 404. This computer-readable data 404 in turn includes a set of processor-executable instructions 406 configured to operate according to one or more of the principles set forth herein. In some embodiments, the processor-executable instructions 406 may be configured to cause the computer 118 (FIG. 1) to perform operations 408 when executed via a processing unit, such as at least some of the example method 200 depicted in FIG. 2 or the method 3 depicted in FIG. 3. In other embodiments, the processor-executable instructions 406 may be configured to implement a system, such as at least some of the example tractor 100 and tillage implement 102 of FIG. 1. Many such computer-readable media may be devised by those of ordinary skill in the art that are configured to operate in accordance with one or more of the techniques presented herein.

The tractor 100 and tillage implement 102 disclosed herein may be used in conjunction with plowing a field in preparation for planting, or at the end of a growing season. By adjusting tilling parameters, the overall yield of the field may be increased because soil may be tilled such that the residue remaining protects the soil from erosion, nutrient loss, and moisture loss. Furthermore, controlling the amount of residue remaining may enable an operator to comply with environmental regulations or qualify for certain incentives.

Additional non-limiting example embodiments of the disclosure are described below.

Embodiment 1: A method of operating a tillage implement having at least one ground-engaging tilling assembly configured to work soil being traversed by the tillage implement, the method comprising performing a first calibration of a tillage implement based on a curated library, propelling the tillage implement through a field such that the at least one tilling assembly works the soil, capturing an image of the field with a camera carried by the tillage implement, comparing information from the captured image with the curated library, identifying residue in the image based on the comparison of the information from the captured image with the curated library, modifying the curated library based on the captured image, and performing a second calibration of the tillage implement based on the modified library. The curated library includes a correlation of previously observed data with material properties of soil and residue.

Embodiment 2: The method of Embodiment 1, wherein capturing an image of the field comprises capturing visible light.

Embodiment 3: The method of Embodiment 1 or Embodiment 2, wherein capturing an image of the field comprises capturing infrared radiation.

Embodiment 4: The method of any one of Embodiments 1 through 3, wherein comparing information from the captured image with the curated library comprises comparing shapes in the captured image with shapes in the curated library.

Embodiment 5: The method of any one of Embodiments 1 through 4, wherein comparing information from the captured image with the curated library comprises comparing a color in the captured image with a color in the curated library.

Embodiment 6: The method of any one of Embodiments 1 through 5, wherein comparing information from the captured image with the curated library comprises comparing a measured reflectivity with the curated library.

Embodiment 7: The method of any one of Embodiments 1 through 6, wherein comparing information from the captured image with the curated library comprises comparing a visible spectrum in the captured image with the curated library.

Embodiment 8: The method of any one of Embodiments 1 through 7, wherein identifying residue in the image comprises determining an amount of residue on a surface of the field.

Embodiment 9: The method of any one of Embodiments 1 through 8, wherein identifying residue in the image comprises identifying material other than grain.

Embodiment 10: The method of any one of Embodiments 1 through 9, wherein identifying residue in the image comprises identifying topography of a surface of the field.

Embodiment 11: The method of any one of Embodiments 1 through 10, wherein identifying residue in the image comprises identifying a property of soil in the field.

Embodiment 12: The method of any one of Embodiments 1 through 11, further comprising adjusting an operating parameter of the tillage implement to maintain a selected amount of residue on a ground surface.

Embodiment 13: The method of Embodiment 12, wherein adjusting an operating parameter of the tillage implement comprises adjusting at least one parameter selected from the group consisting of a gang angle, a gang depth, an implement depth, a shank depth, a time delay, a data-filtering parameter, a finishing tool pressure, a finishing tool angle, a hitch draft load, a wheel load, and a vehicle speed.

Embodiment 14: The method of any one of Embodiments 1 through 13, wherein capturing an image of the field with a camera carried by the tillage implement comprises capturing an image of the field before a tilling assembly carried by the tillage implement works the field.

Embodiment 15: The method of Embodiment 14, further comprising capturing a second image of the field after the tilling assembly works the field.

Embodiment 16: The method of Embodiment 15, further comprising comparing the second image of the field with the curated or modified library.

Embodiment 17: The method of any one Embodiments 1 through 16, wherein the previously observed data comprises known field conditions and crop types.

Embodiment 18: The method of Embodiment 17, wherein the known field conditions comprise at least one known property selected from the group consisting of moisture level, light conditions, soil type, and ground cover amount.

Embodiment 19: A non-transitory computer-readable storage medium, the computer-readable storage medium including instructions that when executed by a computer, cause the computer to perform a first calibration of a tillage implement based on a curated library. The tillage implement has at least one ground-engaging tilling assembly configured to work soil being traversed by the tillage implement. The library includes a correlation of previously observed data with material properties of soil and residue. The instruction further cause the computer to propel the tillage implement through a field such that the at least one tilling assembly works the soil, capture an image of the field with a camera carried by the tillage implement, compare information from the captured image with the curated library, identify residue in the image based on the comparison of the information from the captured image with the curated library, modify the curated library based on the captured image, and perform a second calibration of the tillage implement based on the modified library.

Embodiment 20: A method of operating a tillage implement having at least one ground-engaging tilling assembly configured to work soil being traversed by the tillage implement, the method comprising capturing an image of a field with a camera carried by the tillage implement while the at least one tilling assembly works the soil, comparing the captured image with a curated library, identifying residue in the image based on the comparison of the image with the curated library, adjusting an operating parameter of the tillage implement based at least in part on the identified residue, and modifying the curated library based on the captured image. The curated library includes a correlation of previously observed data with material properties of soil and residue, Embodiment 21: The method of Embodiment 20, wherein adjusting an operating parameter of the tillage implement comprises adjusting at least one parameter selected from the group consisting of a gang angle, a gang depth, an implement depth, a shank depth, a time delay, a data-filtering parameter, a finishing tool pressure, a finishing tool angle, a hitch draft load, a wheel load, and a vehicle speed.

Embodiment 22: A non-transitory computer-readable storage medium, the computer-readable storage medium including instructions that when executed by a computer, cause the computer to capture an image of a field with a camera carried by a tillage implement having at least one ground-engaging tilling assembly while the at least one tilling assembly works soil being traversed by the tilling implement, compare the captured image with a curated library, the curated library including a correlation of previously observed data with material properties of soil and residue, identify residue in the image based on the comparison of the image with the curated library, adjust an operating parameter of the tillage implement based at least in part on the identified residue; and modify the curated library based on the captured image.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various implement types and configurations.

What is claimed is:

1. A method of operating a tillage implement having at least one ground-engaging tilling assembly configured to work soil in a field being traversed by the tillage implement, the method comprising:
   performing a first calibration of the tillage implement based on a curated library, the curated library including a correlation of previously observed data with material properties of soil and residue from other fields;
   propelling the tillage implement through the field such that the at least one tilling assembly works the soil;
   capturing an image of the field with a camera carried by the tillage implement;
   comparing information from the captured image with the curated library;
   identifying residue in the image based on the comparison of the information from the captured image with the curated library;
   modifying the curated library based on the captured image; and
   performing a second calibration of the tillage implement based on the modified library.

2. The method of claim 1, wherein capturing the image of the field comprises capturing visible light.

3. The method of claim 1, wherein capturing the image of the field comprises capturing infrared radiation.

4. The method of claim 1, wherein comparing information from the captured image with the curated library comprises comparing shapes in the captured image with shapes in the curated library.

5. The method of claim 1, wherein comparing information from the captured image with the curated library comprises comparing a color in the captured image with a color in the curated library.

6. The method of claim 1, wherein comparing information from the captured image with the curated library comprises comparing a measured reflectivity with the curated library.

7. The method of claim 1, wherein comparing information from the captured image with the curated library comprises comparing a visible spectrum in the captured image with the curated library.

8. The method of claim 1, wherein identifying residue in the image comprises determining an amount of residue on a surface of the field.

9. The method of claim 1, wherein identifying residue in the image comprises identifying topography of a surface of the field.

10. The method of claim 1, wherein identifying residue in the image comprises identifying a property of soil in the field.

11. The method of claim 1, further comprising adjusting an operating parameter of the tillage implement to maintain a selected amount of residue on a ground surface.

12. The method of claim 11, wherein adjusting the operating parameter of the tillage implement comprises adjusting at least one parameter selected from the group consisting of a gang angle, a gang depth, an implement depth, a shank depth, a time delay, a data-filtering parameter, a finishing tool pressure, a finishing tool angle, a hitch draft load, a wheel load, and a vehicle speed.

13. The method of claim 1, wherein capturing the image of the field with the camera carried by the tillage implement comprises capturing the image of the field before the tilling assembly carried by the tillage implement works the field.

14. The method of claim 13, further comprising capturing a second image of the field after the tilling assembly works the field.

15. The method of claim 14, further comprising comparing the second image of the field with the curated or modified library.

16. The method of claim 1, wherein the previously observed data comprises known field conditions and crop types.

17. The method of claim 16, wherein the known field conditions comprise at least one known property selected from the group consisting of moisture level, light conditions, soil type, and ground cover amount.

* * * * *